United States Patent [19]

Gaspar

[11] 4,072,447
[45] Feb. 7, 1978

[54] ALTERNATING PISTON ROTARY APPARATUS

[76] Inventor: Peter Gaspar, 1567 Parker Ave., Fort Lee, N.J. 07024

[21] Appl. No.: 664,513

[22] Filed: Mar. 8, 1976

Related U.S. Application Data

[63] Continuation-in-part of Ser. No. 375,706, July 2, 1973, abandoned.

[51] Int. Cl.² .......................... F01C 1/00; F04C 17/00; F02B 55/14
[52] U.S. Cl. ........................................ 418/36; 418/33
[58] Field of Search ..................... 123/8.47; 418/36, 33

[56] References Cited

U.S. PATENT DOCUMENTS

| 1,303,255 | 5/1919 | Carter | 123/8.47 |
| 1,452,125 | 4/1923 | Pont | 123/8.47 |
| 1,665,581 | 4/1928 | Dewy | 123/8.47 |
| 1,726,461 | 8/1929 | Weed | 123/8.47 |
| 1,973,397 | 9/1934 | Stromberg | 123/8.47 |
| 2,075,654 | 3/1937 | Martin | 123/8.47 X |
| 3,385,272 | 5/1968 | Winogrodzki et al. | 123/8.47 X |
| 3,396,632 | 8/1968 | Leblanc | 123/8.47 X |

FOREIGN PATENT DOCUMENTS

| 1,332,064 | 6/1963 | France | 123/8.47 |

*Primary Examiner*—John J. Vrablik
*Attorney, Agent, or Firm*—H. Gordon Dyke

[57] ABSTRACT

This rotary engine has two rotary piston carriers, with each of them carrying two pistons which circle a toroidal chamber. Crankshafts contacting those piston carriers offcenter program them in oppositely phased acceleration and deceleration, with two cycles of this superimposed upon one 360° turn of the piston carriers.

Pinion gears are solidly secured to the crankshafts and run in (and mesh with) a fixed ring gear of twice the pinion diameter. That diameter relation precludes running the ordinary shaft through the toroid's central axis. As disclosed here a drum-like assembly is put together which can rotate in that space. Diametrically opposite the offcenter crankshaft is a tie rod. Both it and the crankshaft are secured to the piston carriers snugly against any looseness, and this drum-like assembly rotates continuously at and around the central axis. Thus this 4-piston rotary engine is able to and does employ a four-stroke cycle and gives four power strokes per revolution and without some of the disadvantages found in the rather few prior art instances of rotary engines meeting those conditions.

Two modifications of this first form are (2) a more elaborately balanced form that can put through more power has two crankshafts with their pinions staggered along the axis and meshing a double-track ring gear; and (3) a single crankpin crankshaft accelerating and decelerating one piston carrier while the other runs at a constant rate.

15 Claims, 9 Drawing Figures

ALTERNATING PISTON ROTARY APPARATUS

This application is a continuation-in-part of my U.S. patent application Ser. No. 375,706 filed July 2, 1973, now abandoned.

This invention is a rotary engine wherein four pistons all revolve within a toroidal piston chamber, both of two pistons that are diammetrically opposite each other being mounted on one wheel-like piston carrier, and the other pair which are diammetrically opposite each other being mounted on a second wheel-like piston carrier.

The two piston carriers both revolve with a constant component of rotational velocity, and at least one piston carrier, and preferably both, also has a cyclically variable component of rotational velocity. Thus adjacent pistons alternately move apart and move closer to each other as they continuously rotate whereby repetition of the engine's cycle occurs.

The forces that alternately drive adjacent pistons apart or together are transformed through a motion transforming mechanism into forces that drive the constant rotation component of motion. Rotary engines of this general type are old in the art, in for example these U.S. Pat. Nos. Weed 1,024,166; Bullington 1,676,211; Weed 1,726,461; Bregere 1,729,242; Tschudi 2,734,489; Bancroft 3,241,531 and Winogrodski 3,385,272.

The general nature of operation of engines of this sort is well known, for example from the foregoing patents, and therefore need not be set forth at length here.

Rotary motion has advantages over reciprocating motion, one of these being greater smoothness of action. Also parts that are fingers of revolution can be easier and less expensive to build, can be designed to be lighter and smaller for a given power output, and can be developed to need less maintenance. The further fact that valves can be dispensed with and ports substituted in this type of engine is a further great advantage.

Despite the promising possibilities of engines of this sort, no one to the knowledge of this applicant has ever built one that was really successful. This applicant has focused upon a four-piston, four stroke cycle engine giving four power strokes per revolution, as a preferred embodiment. Simpler specifications than this tend to be inefficient or unreliable but can be suitable for some special uses. More elaborate specifications, including particularly eight-piston engines, tend to be more costly, harder to develop, and quicker to give trouble.

To establish terminology, my engine case includes an enclosed chamber shaped like the space within a tube bent around a circle to form a butt joint with itself, and the space within the tube itself will be herein called the toroidal piston chamber. The space that corresponds to the circle that the tube was bent around will be herein called the center space of the torus.

In my invention the piston carriers are essentially figures of revolution and similar to wheels of any of various types including flat discs and dished rims, and they may have portions cut away. Each of my two piston carriers bears a pair of pistons; the individual pistons of the two pairs alternating in occurrence around the toroidal piston chamber. My toroidal piston chamber is concentric with the piston carriers, having common central axis with the engine as a whole.

For smoothness and maximum power it is necessary to have the phases of the pistons and other moving parts in the engine quite positively, precisely, and uniformly related to each other. Moreover if looseness permits canting, or imbalance causes shaking, the parts can soon destroy each other and thereby the engine.

These requirements would seem to indicate inclusion of a main shaft extending uninterruptedly through from front to back of the engine. However it is not possible to so extend the shaft if a four-stroke-per-revolution engine is built employing a pinion gear inside an internally toothed ring gear to give the four strokes, because the pinion gear needs to be exactly half the pitch diameter of the ring gear (and of tip diameter somewhat more than half) whereby the pinion gear sweeps through all the central space than an axial main shaft would occupy. This problem has driven prior art inventors to a variety of expedients, none of them very successful. The present applicant has devised a novel and superior solution to these problems.

My motion-transforming mechanism occupies the center space of the torus and may project somewhat in both directions along the straight-line central axis of the torus or parallel thereto. Here a drum rotates with the main shaft, and contains parts that revolve with the drum and also rotate at twice its rate. The drum also has parts that revolve with the drum as a whole and additionally rock forward and back repetitively about the same axis of the drum, so they rotate at a cyclically varying rate. My motion-transforming mechanism employs at least one crankshaft with its web portion between the two piston carriers and its one or more crankpins each extending through a generally radial slot in a rotary piston carrier that is cut out between its axial center and its periphery.

Figure 1:
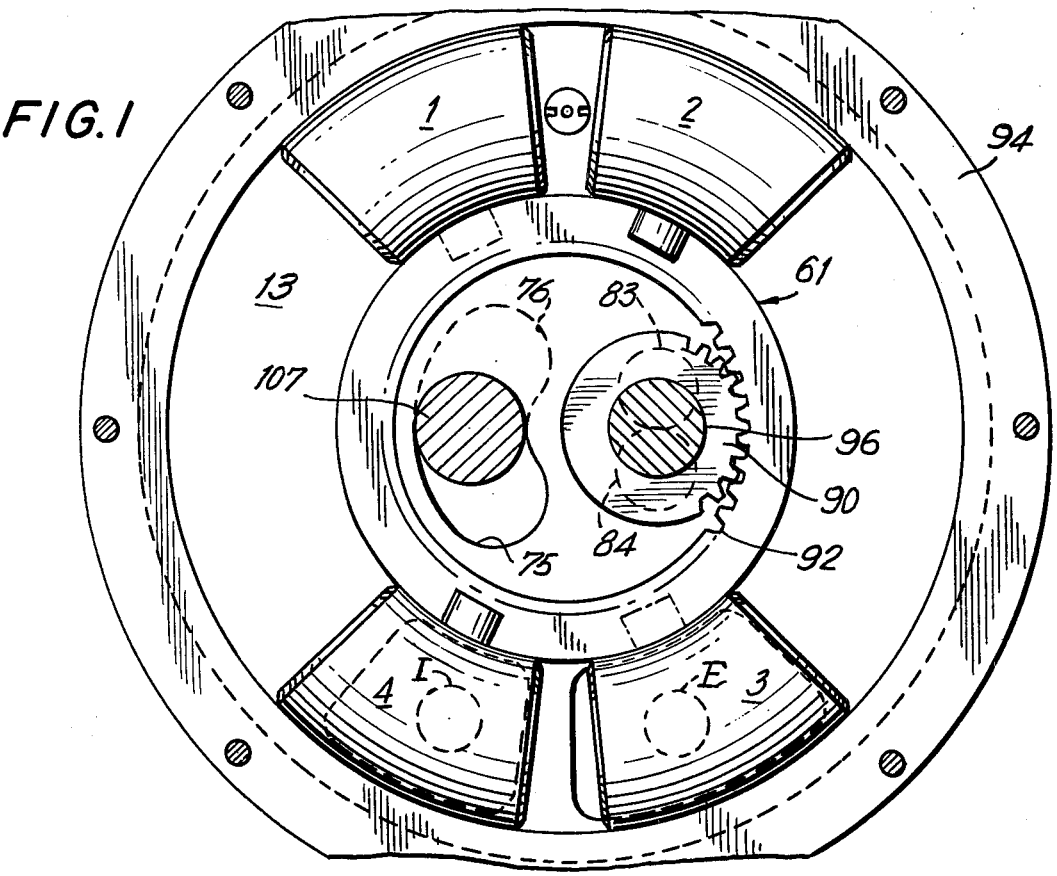
FIGS. 1 and 2 are somewhat diagrammatic views representing a transverse section taken on the line 1 — 1 of FIG. 3, at two different phases of piston travel.
Figure 2:
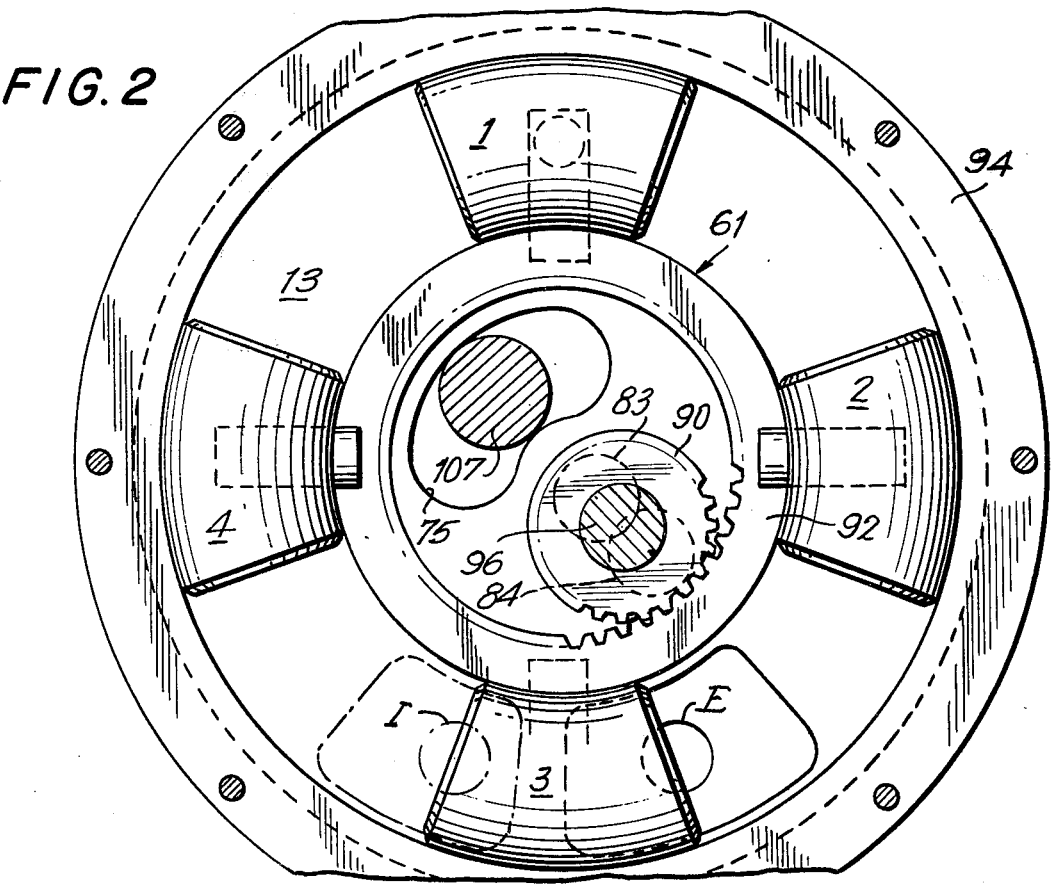

FIGS. 1 and 2 illustrate how two pistons (1 and 3) attached to one piston carrier remain always opposite each other, and two other pistons (2 and 4) located in the two arcuate spaces between the first two pistons are attached to a second piston carrier. If now there is relative oscillation between the two piston carriers each of the four spaces now found between the several pistons will cyclically increase and decrease for two of them, and decrease and increase for the other two (which are in opposite phase from the first two.)

Figure 3:
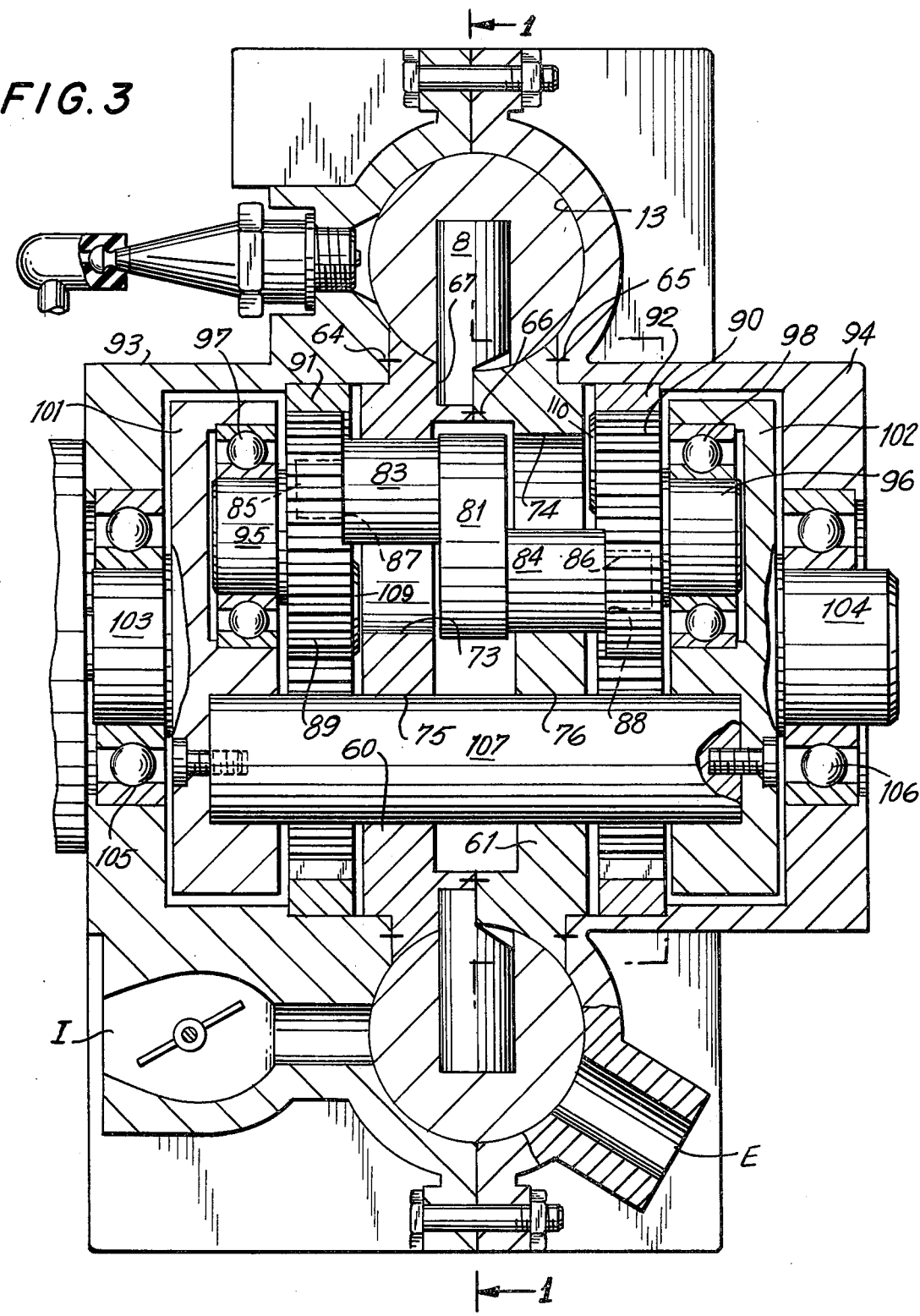
FIG. 3 is a longitudinal vertical section of the engine, with some parts not sectioned but appearing in elevation.

As seen particularly in FIG. 3 a casing with left half 93 and right half 94 forms a generally cylindrical central crank case with a toroidal piston chamber 13 encircling it. Any desired power take-off may project through the walls of the casing, preferably journals, fitting in ball bearings 105,106. This power take-off most commonly will be a rotary stub shaft suitable for coupling an elongation (or a load direct) onto. Such a stub shaft is shown at 104, and another (103) may project at the opposite end, most commonly for ignition timing and auxiliaries, a supercharger for example. These projections will most commonly be coaxial with the torus, together defining the main axis of the engine.

On these projections at their ends inside the casing, drumheads, discs, or arms 101,102 will be secured. These will rotate directly with the journals. At corresponding off-center locations they have ball bearings for reception of journal stubs 95, 96 that are at the ends of the crankshaft system and define its principal axis.

The crankshaft system includes—to each side of its center, proceeding successively in from the ends —a control gear of diameter $x$ and with teeth across its periphery, which is concentric with the principal axis of the crankshaft system. Next in from the gears come oppositely off-center crankpins 83, 84 with their stub ends 85, 86 solidly secured in recesses 87,88 in control gears 89, 90. These crankpins fit in radial slots 73,74 formed in the two wheel-like piston carriers 60, 61. These radial slots are seen in lengthwise section in FIG. 3 and similar slots have their outlines indicated in phantom in FIG. 5. Web 81 joins the two oppositely off-center crankpins 83, 84.

The piston carriers 60, 61 have peripheral recesses 67 where are mounted bolts or pins 8 that project into the pistons and tie them, circumferentially, to the piston carriers so the pistons must move in their orbit the way the piston carriers move.

The toroidal piston chamber has an exhaust port E and an intake port I formed in the chamber at the proper locations for a four-stroke-cycle engine.

Let us assume that for starting, main shaft 104 is rotated by external force. The entire internal drum assembly rotates in unison with it, from drumhead 101 to drumhead 102 both inclusive, turning about the axis of the end journals 103, 104. As the drum rotates it will sweep the gears 89, 90 around meshing ring gears 91,92 which are fixed in the case and have teeth pointing radially inward. These fixed ring gears have diameter $2x$ and the number of teeth for each is twice the number of teeth of each rotating gear 89,90. The ring gears serve as reactors, making the movable smaller gears rotate twice in the course of one revolution. Since these smaller gears bear the crankshaft 83, 81, 84, the crankpins transmit four strokes of advance, retard, advance, retard to the pistons, with the two pairs of pistons oppositely phased. In addition, of course, all the pistons are swept once around the toroid by the rotating bodily of the whole drum assembly. This brings them to the various stations (ignition, exhaust, intake, etc.) as the proper phases of the pistons' spacing sequence occur.

When the engine starts, the very same process continues, but now with the driving power coming from the gases between the pistons.

As seen in FIGS. 1 and 2 each piston carrier also has an arcuate slot centered on the main axis and located opposite its radial slot. Through these arcuate slots in the two piston carriers extends a tie rod 107 solidly secured in recesses in the drumheads 101, 102. The arcuate slots 75, 76 give a free enough sliding fit with the tie rod that the tie rod, which revolves solidly with the drum as a whole, does not drag in the arcuate slots of the piston carriers which are—because of the crankshaft—performing oscillations superimposed upon their revolving. The tie rod is made of size that brings the entire drum assembly to net balance about its axis. The crankpins at the two sides of the crankshaft's web balance each other in radial vector, but not longitudinally along the crankshaft's axis. To avoid wobbling therefrom, counterweights 109, 110 of whatever sizes are required for balance may be incorporated at the inward faces of the traveling gears 89, 90, diametrically opposite the near crankpin's location.

Figure 4:
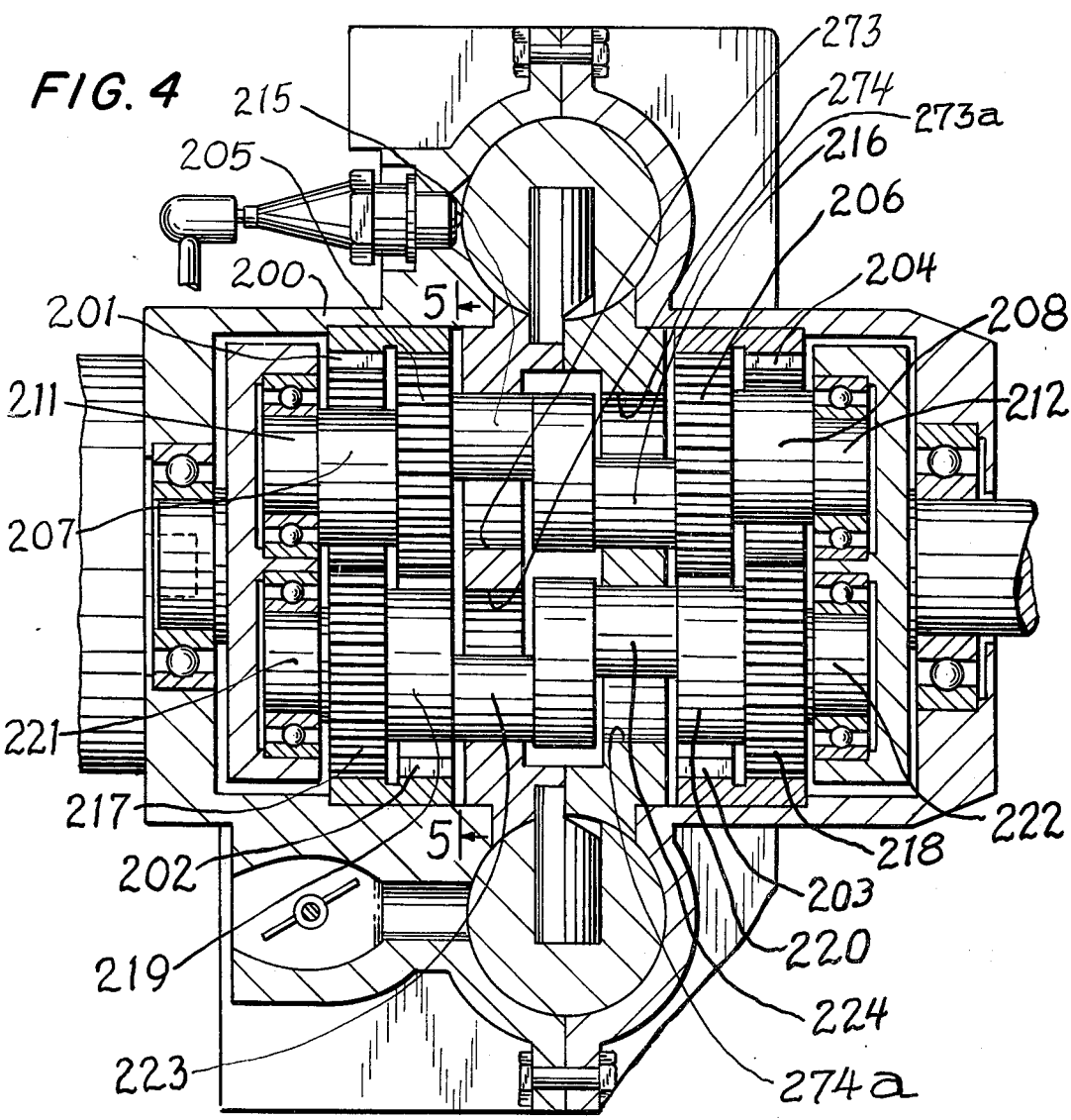
FIG. 4 is a similar section of a modified form with more than two gear wheels.

My invention also includes a form shown in FIG. 4 which is generally like the form of FIG. 3. Only the differences will be discussed.

Here the casing 200 is lengthened axially, and two large fixed ring gears 201,202 and 203,204 side by side (or a double track single gear) are installed at each end. One crankshaft has its two traveling gears 205,206 meshed with the two inner ring gears 202 and 203. Beyond these gear wheels a short length of shaft 207,208 bridges between the traveling gear 205, 206 and the end journal 211, 212, and it is mechanically integrated with both. This length of shaft 207,208 is sufficiently massive and sufficiently off-center relative to the small gear 205,206 and the end journal 211, 212 that it balances the near crankpin 215, 216, respectively. This arrangement is provided toward each end of the crankshaft system.

180° opposite the upper crankshaft system there is no tie rod in this form of the invention; instead a duplicate crankshaft system is installed. There is one difference in it, namely that the small gear 217, 218 and the short length of shaft 219,220 are interchanged. Thus the gears 217,218 in this second (lower) crankshaft system are out next to the end journals 221, 222 and ride in the outer gear tracks 201, 204. The short lengths of shaft 219, 220 lie in the general planes of the inner fixed ring gears 202, 203 but in each case it is sufficiently smaller in radius than the traveling gear that it does not touch any gear. This bridging shaft 219, 220 like the other is eccentric to diametrically oppose the near crankpin 223, 224 and of proper mass to balance it.

Figure 5:
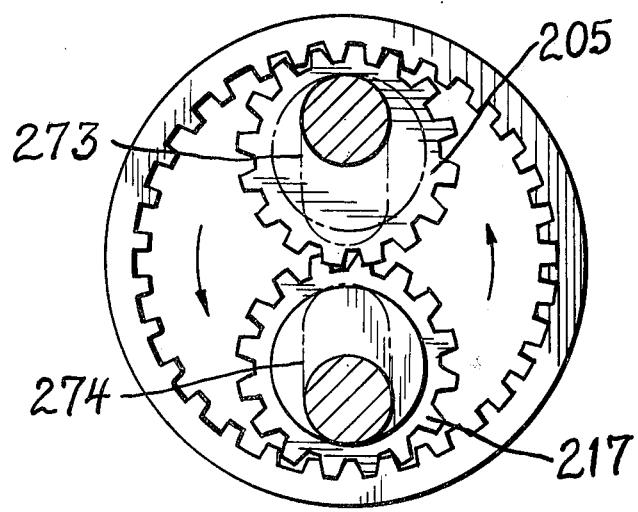
FIG. 5 is a diagrammatic view taken on the line 5 — 5 of FIG. 4 showing the two diametrically overlapping but longitudinally staggered gears.

FIG. 5 shows two traveling gears 205, 217, at one end, overlapping each other radially, but they do not touch each other because of being staggered axially. The piston carriers' radial slots 273, 274 and 273a, 274a which the crankpins work in to transform rotary to oscillatory motion or vice versa, are seen in phantom since they lie back of the line 5 — 5 on which FIG. 5 is taken.

Figure 6:
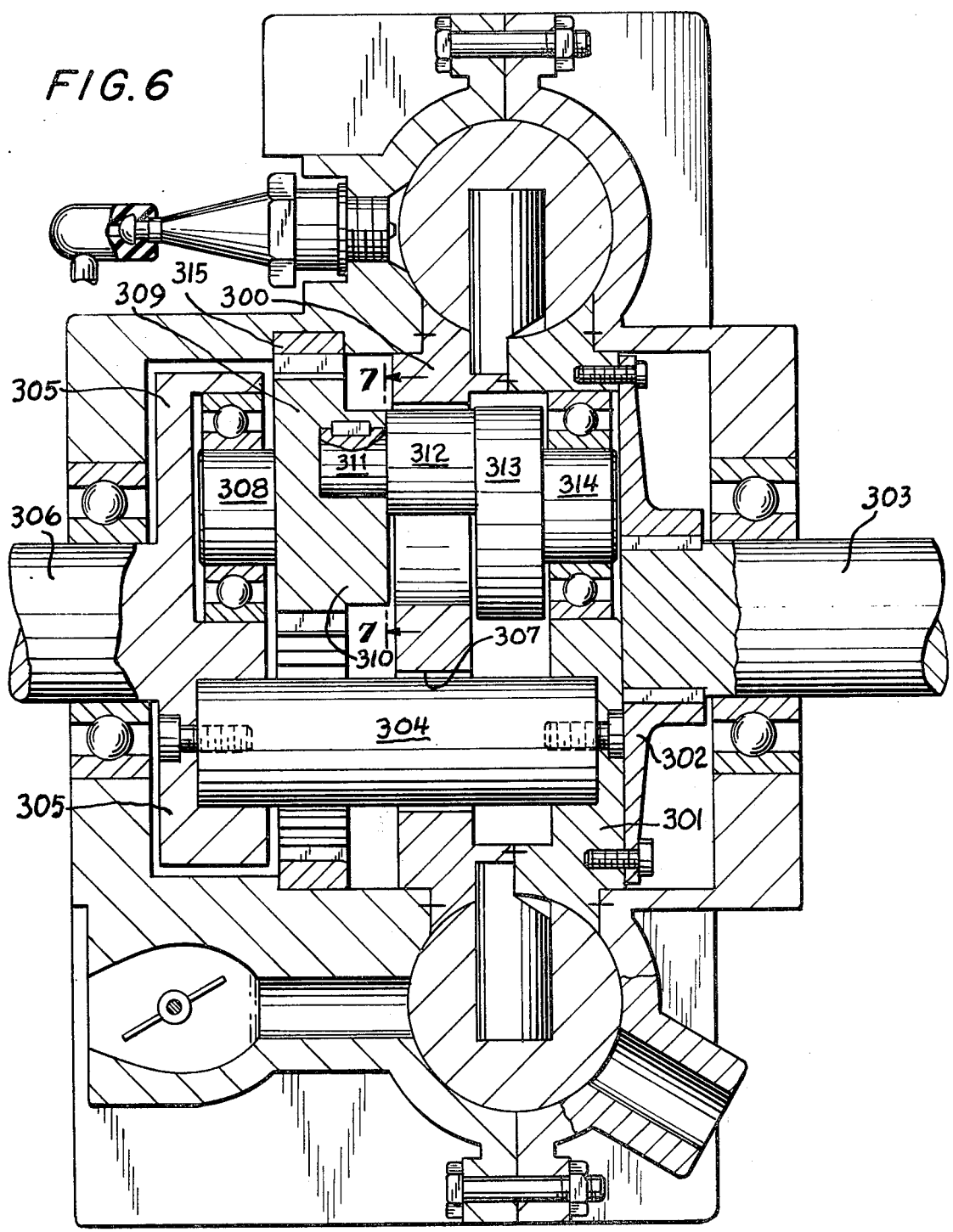
FIG. 6 is a view similar to FIG. 3 but showing a form of the invention wherein two pistons have constant speed.

FIG. 6 illustrates an embdiment of my invention in which one piston carrier rotates at constant velocity while the other has superposed upon its otherwise same constant velocity an oscillatory component. With the oscillatory excursions made longer, or other appropriate changes in proportions, this gives approximately the equivalent of the form of my invention shown in FIG. 3 but in a simpler form.

Here right piston carrier 301 is solidly attached through plate 302 to main shaft 303, and all these have constant rotation at a given setting of external parameters such as rate of fuel feed. This same constancy in rotation holds also for mechanically integrated tie rod 304, left end plate (or drum head) 305, and front shaft 306.

Tie rod 304 balances a diametrically opposite crankpin rotary system also supported in part by right piston carrier 301, and passes freely through arcuate slot 307 in left piston carrier 300, as was the case in FIG. 3.

The crankpin rotary system includes left end journal 308 rotatably held in drum head 305, traveling pinion gear 309 with counterweight 310 formed therein, stub end of crankpin unit 311, crankpin 312, web 313, and the right stub end thereof 314 journaled in piston carrier 301. The counterweight 310 has moments of inertia equal and opposite to single crankpin 312.

At the inner surface of the casing a ring gear 315 is secured. Its teeth face radially in. The traveling pinion gear 309 has half its number of teeth and meshes with it.

In operation, with each rotation of main shaft 303, front shaft 306, and the drum parts between, there are two rotations of the crankpin system which includes traveling gear 309; this rotation is caused by this smaller traveling gear being swept around the larger fixed gear.

For some uses this is a superior form, being somewhat easier to make and also easy to impart a quite fine balance to.

Figure 7:
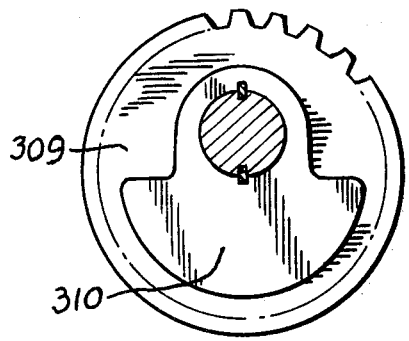
FIG. 7 shows a face of a control gear such as gear 89 in FIG. 3 or gear 309 in FIG. 6, with localized off-center thickening to constitute a counterweight.

FIG. 7 shows the front face of my traveling pinion gear 309 with most of its face to one side of a given diameter being fattened to constitute a counterweight 310, this fattening desirably also rimming the pin that is solidly secured to this gear wheel, for strengthening.

Figure 8:
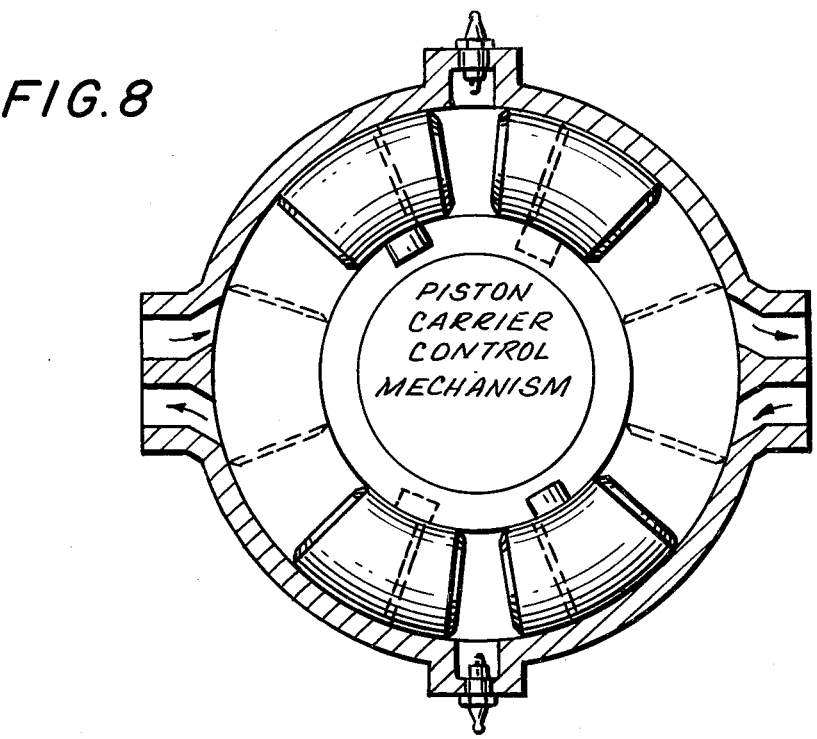
FIG. 8 is a diagram indicating the control mechanisms of any of the foregoing figures applied to a two-stroke-cycle engine arrangement.

My invention in all the forms shown herein can if desired be incorporated into a two-stroke-cycle engine as indicated in FIG. 8. The control mechanism can be the same, with little or no change. This arrangement would be preferred for some uses, for example ones in which horsepower per pound is more important than miles per gallon.

Figure 9:
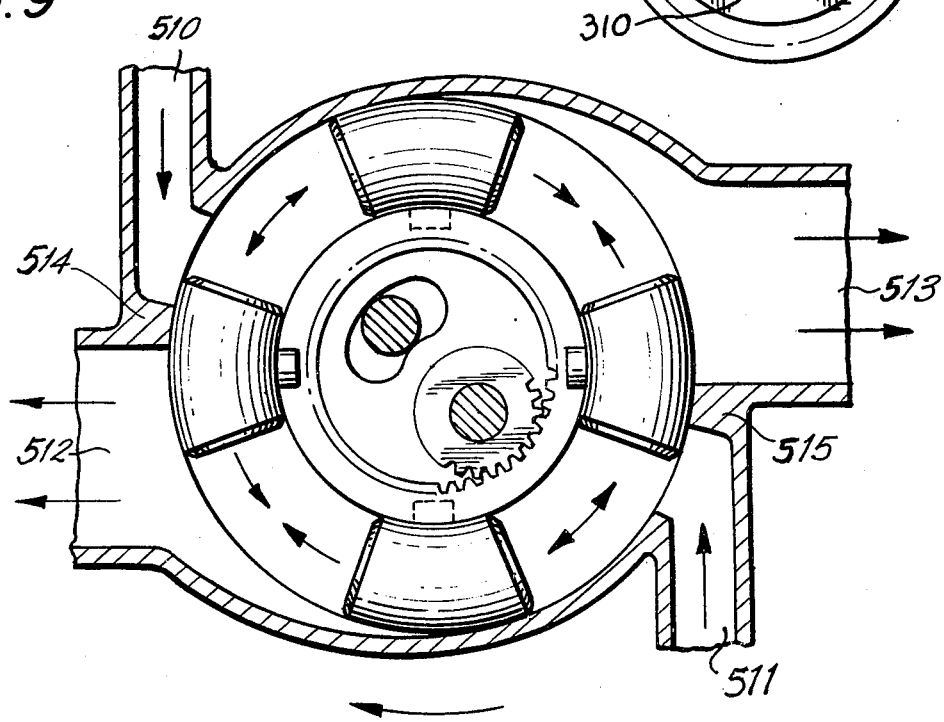
FIG. 9 is a diagram indicating the control mechanism of FIGS. 1 - 6 applied to a pump or compressor.

As indicated in FIG. 9 my piston carrier control mechanism can be incorporated into a pump or compressor. Feed can be at opposite fixed ports 510, 511 located at the spaces between pistons where they draw apart, while exit ports 512, 513 are located at the spaces between pistons where they come toward each other. Narrow walls 514, 515 in the casing separate these ports. Further detail in the casing wall will be designed to suit the pressures, volumes, and compressibility of the fluid to be handled.

I claim:

1. Rotary apparatus having a casing shaped to form generally a toroidal hollow annular chamber therein, said casing having an opening into said chamber which is circularly continuous about the central axis of the torus, inlet and exhaust means through the structure that defines the toroidal chamber and communicating with that chamber, said apparatus also having two generally wheel-like and generally figure of revolution shaped piston carrier members, which are mounted rotatably with their axes at the central axis of the torus, said piston carriers each having a flange-like generally continuous peripheral portion, exactly two pistons on each piston carrier and carried by a flange portion of each of said two piston carriers and fitting within the toroidal chamber in alternating occurrence about the toroid as respects which piston carrier each piston is carried by, a flange-like portion of each of said piston carriers serving to close at least in part the circularly continuous opening in the toroidal chamber that was left by the casing, a generally radial slot opening through an intermediate portion of at least a first piston carrier, a crankshaft extending through said slot, a crankpin of said crankshaft located in said slot, and said crankshaft extending into a portion of the second piston carrier, a ring gear with inwardly facing teeth fixed to the casing concentric with the central axis, a gear wheel operatively connected to said crankshaft and having a pitch diameter one half of the ring gear's and mounted within the ring gear and meshing with it and having its teeth sweep through the central axis, leaving a crescent shaped empty space between the ring gear and the gear wheel that has half its diameter, a rotary header member to that side of the ring gear which is farther from the first piston carrier, said rotary header member being journaled for rotation about the central axis and having secured in it the crankshaft's axial journal, whereby this rotary header member rotates at the same rate as the revolutions of the crankshaft bodily (as distinguished from the crankshaft's rotations), a functionally similar rotary header member being provided beyond the ring gear, to the opposite side from the first mentioned header member and mounted for rotation about the central axis, said rotary apparatus also including at least one other member that passes through the crescent-shaped open space and secures the two opposite header members to each other, for firmly securing the two headers against relative motion or looseness of either with respect to the other, the headers and connected parts that rotate with the constituting a drum assembly.

2. Apparatus of claim 1 in which both piston carriers have generally radial slots and the crankshaft has two oppositely phased crankpins and one of them extends into each piston carrier.

3. Apparatus of claim 1 in which each of the two piston carriers has an arcuate slot opposite the generally radial slot and said other member comprises a stiffening tie rod and counterweight which passes through those slots and at each end is solidly secured to the opposite header members.

4. Apparatus of claim 1 which has exactly four pistons, a four-stroke cycle, and four power strokes per revolution.

5. The apparatus of claim 1 constructed as a pump.

6. The apparatus of claim 1 constructed as a compressor.

7. Rotary apparatus of claim 1 in which the two piston carriers are dished back at their facing sides forming a central space, a crankshaft web fits between them in said central space, the piston carriers are provided with rims in their peripheral regions, which rims border the central space provided by the dishing and come close together.

8. Rotary apparatus of claim 1 in which the cross-tying member which augments the first crankshaft in tying the headers together is at least one crankshaft which is generally like the first crankshaft and the crankshafts are equi-angularly spaced about the drum.

9. Rotary apparatus of claim 1 in which only one piston carrier has a crankpin-receiving radial slot therein and the other piston carrier is solidly connected to a main shaft, a flanged hub having its central hub portion solidly secured to the main shaft and its flange solidly secured to the other piston carrier whereby this other piston carrier, the flanged hub, and the main shaft are mechanically solidified and move only in rotating solidly together.

10. Rotary apparatus of claim 1 in which the crankshaft has only one crankpin and only one pinion gear, the casing has only one fixed ring gear, and the cross-typing member between the header members is solidly fixed to the two header members.

11. Apparatus of claim 1 in which the gear wheel has a diameter x and the ring gear has a diameter 2x.

12. Apparatus of claim 11 in which there are two crankshafts and each has a gear wheel, the two gear wheels are staggered longitudinally and the ring gear includes two track paths of gear teeth positioned at the radially outward loci of the tips of the staggered gear wheels.

13. Apparatus of claim 11 in which an end of the crankshaft is journaled into said second piston carrier and a plate, mechanically integrated to said second piston carrier, has an outward axial portion journaled in a portion of the casing and serving as part of the power take-off train.

14. Apparatus of claim 1 in which there are two crankshafts mounted diametrically opposite each other in the drum assembly, and at least one piston carrier has two generally radial slots therein diametrically opposite each other.

15. Apparatus of claim 1 in which both crankshafts have two crankpins each and both piston carriers have two generally radial slots each.

* * * * *